US006997971B1

(12) United States Patent
Young et al.

(10) Patent No.: US 6,997,971 B1
(45) Date of Patent: Feb. 14, 2006

(54) CROSS-LINKED POLYBENZIMIDAZOLE MEMBRANE FOR GAS SEPARATION

(75) Inventors: Jennifer S. Young, Los Alamos, NM (US); Gregory S. Long, Los Alamos, NM (US); Brent F. Espinoza, Los Alamos, NM (US)

(73) Assignee: The Regents of the University of California, Los Alamos, NM (US)

( * ) Notice: Subject to any disclaimer, the term of this patent is extended or adjusted under 35 U.S.C. 154(b) by 33 days.

(21) Appl. No.: 10/901,401

(22) Filed: Jul. 28, 2004

(51) Int. Cl.
*B01D 53/22* (2006.01)
*B01D 71/58* (2006.01)

(52) U.S. Cl. .................. 95/45; 95/47; 95/50; 95/51; 95/55; 96/13; 96/14

(58) Field of Classification Search .............. 95/45, 95/47, 51, 55, 50; 96/4, 12–14; 55/524, 55/DIG. 5
See application file for complete search history.

(56) References Cited

U.S. PATENT DOCUMENTS

| | | | |
|---|---|---|---|
| 2,895,948 A | | 7/1959 | Brinker |
| RE26,065 E | | 7/1966 | Marvel |
| 3,699,038 A | | 10/1972 | Boom |
| 3,720,607 A | | 3/1973 | Brinegar |
| 3,737,042 A | | 6/1973 | Boom |
| 3,822,202 A | | 7/1974 | Hoehn |
| 3,932,542 A | * | 1/1976 | Gerns ................... 570/206 |
| 4,005,053 A | * | 1/1977 | Briggs et al. ............ 523/334 |
| 4,020,142 A | | 4/1977 | Davis |
| 4,154,919 A | | 5/1979 | Sheratte |
| 4,263,245 A | * | 4/1981 | Tan ....................... 264/184 |
| 4,431,796 A | * | 2/1984 | Choe et al. ............. 528/336 |
| 4,448,687 A | | 5/1984 | Wang |
| 4,448,955 A | * | 5/1984 | Choe et al. ............. 528/207 |
| 4,452,967 A | * | 6/1984 | Conciatori et al. ...... 528/207 |
| 4,512,894 A | | 4/1985 | Wang |
| 4,634,530 A | | 1/1987 | Kuder |
| 4,666,996 A | | 5/1987 | Sansone |
| 4,933,083 A | | 6/1990 | Jones, Jr. |
| 5,034,026 A | * | 7/1991 | Summers et al. ............. 95/47 |
| 5,232,574 A | * | 8/1993 | Saika et al. ............. 204/418 |
| 5,612,478 A | * | 3/1997 | Xu et al. ................. 540/474 |
| 5,618,332 A | * | 4/1997 | Ekiner et al. ............... 95/51 |
| 5,679,133 A | * | 10/1997 | Moll et al. ................. 95/45 |
| 6,489,052 B1 | * | 12/2002 | Acker ..................... 429/40 |
| 6,681,648 B1 | * | 1/2004 | Dye et al. ................. 73/866 |
| 2002/0006757 A1 | * | 1/2002 | Wyss ..................... 442/181 |
| 2003/0134286 A1 | * | 7/2003 | Edwards et al. ............ 435/6 |
| 2003/0208014 A1 | | 11/2003 | Kerres |

OTHER PUBLICATIONS

J. S. Young, B. S. Jorgensen, B. F. Espinoza, M. W. Weimer, G. D. Jarvinen, Christopher J. Orme, Alan, K. Wertsching, Eric S. Peterson, Vivek Khare, Alan R. Greenberg, and Scott Hopkins, Polymeric-Metallic Composite Membranes for High-Temperature Applications, published Nov. 2001, pp. 1-7.

Herward Vogel and C. S. Marvel, "Polybenzimidazoles, New Thermally Stable Polymers," Journal of Polymer Science, 1961, vol. L, pp. 511-639.

Herward Vogel and C. S. Marvel, "Polybenzimidazoles II," Journal of Polymer Science, Part A, 1963, vol. 1, pp. 1531-1541.

Lloyd M. Robeson, "Correlation of Separation Factor Versus Permeability for Polymeric Membranes," Journal of Membranes Science, 1991, vol. 62, pp. 165-185.

M. E. Rezac and W. J. Koros, "Preparation of Polymer-Ceramic Composite Membranes with Thin Defect-Free Separating Layers," Journal of Applied Polymer Science, 1992, vol. 46, pp. 1927-1938.

W. J. Koros and G. K. Fleming, "Membrane-Based Gas Separation," Journal of Membrane Science, 1993, vol. 83, pp. 1-80.

Hidetoshi Kita, Tetsuya Inada, Kazuhiro Tanaka, and Ken-Ichi Okamoto, "Effect of Photocrosslinking of Permeability and Permselectivity of Gases Through Benzophenone-Containing Polyimide," Journal of Membrane Science, 1994, vol. 87, pp. 139-147.

May-Britt Hägg, "Membranes in Chemical Processing A Review of Applications and Novel Developments," Separation and Purification Methods, 1998, vol. 27, pp. 51-168.

Claudia Staudt-Bickel and William J. Koros, "Improvement of $CO_2/CH_4$ Sepration Characteristics of Polyimides by Chemcial Crosslinking," Journal of Membrane Science, 1999, vol. 155, pp. 145-154.

Y. Liu, C. Pan, M. Ding, and J. Xu, "Effect of Crosslinking Distribution on Gas Permeability and Permselectivity of Crosslinked Polyimides," European Polymer Journal, 1999, vol. 35, pp. 1739-1741.

William J. Koros and Rajiv Mahajan, "Pushing the Limits of Possibilities for Large Scale Gas Separation: Which Strategies?," Journal of Membrane Science, 2000, vol. 175, pp. 181-196.

Rajiv Mahajan and William Koros, "Mixed Matrix Membrane Materials with Glassy Polymers, Part 2," Polymer Engineering and Science, Jul. 2002, vol. 42, No. 7, pp. 1432-1441.

* cited by examiner

Primary Examiner—Robert H. Spitzer
(74) Attorney, Agent, or Firm—Samuel L. Borkowsky

(57) ABSTRACT

A cross-linked, supported polybenzimidazole membrane for gas separation is prepared by reacting polybenzimidazole (PBI) with the sulfone-containing crosslinking agent 3,4-dichloro-tetrahydro-thiophene-1,1-dioxide. The cross-linked reaction product exhibits enhanced gas permeability to hydrogen, carbon dioxide, nitrogen, and methane as compared to the unmodified analog, without significant loss of selectivity, at temperatures from about 20 degrees Celsius to about 400 degrees Celsius.

28 Claims, 3 Drawing Sheets

CROSS-LINKED POLYBENZIMIDAZOLE MEMBRANE FOR GAS SEPARATION

STATEMENT REGARDING FEDERAL RIGHTS

This invention was made with government support under Contract No. W7405-ENG-36 awarded by the U.S. Department of Energy. The government has certain rights in the invention.

FIELD OF THE INVENTION

The present invention relates generally to gas separation and more particularly to a cross-linked polybenzimidazole membrane used for gas separation.

BACKGROUND OF THE INVENTION

The last decade has seen a dramatic increase in the use of polymer membranes as effective, economical and flexible tools for many gas separations. The processability, gas solubility, and selectivity of several classes of polymers (such as polyimides, polysulfones, polyesters, and the like) have led to their use in a number of successful gas separation applications. A drawback to the use of polymer membranes for gas separation can be their low permeability or inadequate selectivity. In most instances, the success of a given membrane rests on achieving an appropriate combination of adequate permeability and selectivity.

Polymer membranes can be used for air separation, for the recovery of hydrogen from mixtures of nitrogen, carbon monoxide and methane, and for the removal of carbon dioxide from natural gas. For these applications, glassy polymer membranes provide high fluxes and excellent selectivities based on size differences of the gas molecules being separated.

Separation of hydrogen ($H_2$) and carbon dioxide ($CO_2$) from mixed gas streams is of major industrial interest. Current separation technologies require cooling of the process gas to ambient temperatures. Significant economic benefit could be realized if these separations are performed at elevated temperatures (greater than 150° C.). Consequently, much effort is directed at identifying and developing polymers that are chemically and mechanically stable at elevated temperatures and high pressures. Linear polybenzimidazole is an example of such a polymer. Representative patents and papers that describe membranes of linear polybenzimidazole include U.S. Pat. No. 2,895,948 to K. C. Brinker et al. entitled "Polybenzimidazoles," which issued Jul. 21, 1959; RE 26,065 entitled "Polybenzimidazoles and Their Preparation," which reissued to C. S. Marvel et al. on Jul. 19, 1966; "Polybenzimidazoles, New Thermally Stable Polymers," H. Vogel et al., J. Poly. Sci., vol. L., pp. 511–539, 1961; "Polybenzimidazoles II," H. Vogel et al., J. Poly. Sci. Part A, vol. 1, pp. 1531–1541, 1963; U.S. Pat. No. 3,699,038 to A. A. Boom entitled "Production of Improved Semipermeable Polybenzimidazole Membranes, which issued Oct. 17, 1972; U.S. Pat. No. 3,720,607 to W. C. Brinegar entitled "Reverse Osmosis Process Employing Polybenzimidazole Membranes," which issued Mar. 13, 1973; U.S. Pat. No. 3,737,042 entitled "Production of Improved Semipermeable Polybenzimidazole Membranes," which issued to W. C. Brinegar on Jun. 5, 1973; and U.S. Pat. No. 4,933,083 entitled "Polybenzimidazole Thin Film Composite Membranes," which issued to R. Sidney Jones Jr. on Jun. 12, 1990, all of which are incorporated by reference herein. These patents and papers show that, for years, polybenzimidazole membranes have been useful for liquid phase separations such as reverse osmosis separations, ion exchange separations, and ultrafiltration.

Polybenzimidazole is also useful for gas separations. In U.S. Pat. No. 6,681,648 to Robert C. Dye et al. entitled "Meniscus Membranes for Separations," for example, meniscus-shaped polybenzimidazole supported on a stainless steel substrate was useful for separating $H_2$ from an $H_2/CO_2$ mixture, and $CO_2$ from a $CO_2/CH_4$ mixture, and that membrane performance improves as the temperature increases from 25° C. to 250° C.

The mechanical properties of polybenzimidazole may be improved by cross-linking (see, for example, U.S. Pat. No. 4,020,142 to Howard J. Davis et al. entitled "Chemical Modification of Polybenzimidazole Semipermeable Membranes," which issued Apr. 26, 1977). According to the '142 patent, crosslinked polybenzimidazole is tougher than non-cross-linked analogs and shows improved compaction resistance during prolonged usage at higher pressures. While cross-linked polybenzimidazole has been shown to be useful for liquid separations (separations in acid waste streams, reverse osmosis separations, ion exchange separations, and ultrafiltration separations), there is little information available related to gas separation using cross-linked polybenzimidazole.

Accordingly, an object of the present invention is to provide a method for separating gases using cross-linked polybenzimidazole.

Another object of the invention is to provide a cross-linked polybenzimidazole membrane for gas separation.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

In accordance with the purposes of the present invention, as embodied and broadly described herein, the present invention includes the polymeric reaction product of a polybenzimidazole and a crosslinking agent having the formula

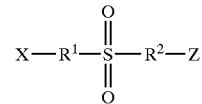

wherein $R^1$ and $R^2$ are independently selected from alkyl having from 1 to 20 carbons, aryl having from 6 to 18 carbons, substituted aryl; wherein $R^1$ and $R^2$ are connected to form a ring structure having from 2 to 5 carbons; and wherein X and Z are independently selected from chloride, bromide, and iodide.

The invention also includes a method for gas separation. The method involves sending a gas mixture through a membrane that includes the cross-linked polymeric reaction product of the reaction between polybenzimidazole and a crosslinking agent having the formula

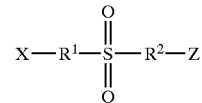

wherein $R^1$ and $R^2$ are independently selected from alkyl having from 1 to 20 carbons, aryl having from 6 to 18 carbons, substituted aryl; wherein $R^1$ and $R^2$ are connected to form a ring structure having from 2 to 5 carbons; and wherein X and Z are independently selected from chloride, bromide, and iodide.

The invention also includes a method for separating carbon dioxide from a gas mixture. The method involves sending a gas mixture that includes carbon dioxide through a membrane comprising the cross-linked polymeric reaction product of the reaction between polybenzimidazole and a crosslinking agent having the formula

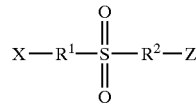

wherein $R^1$ and $R^2$ are independently selected from alkyl having from 1 to 20 carbons, aryl having from 6 to 18 carbons, substituted aryl; wherein $R^1$ and $R^2$ are connected to form a ring structure having from 2 to 5 carbons; and wherein X and Z are independently selected from chloride, bromide, and iodide.

The invention also includes a method for separating hydrogen from a gas mixture. The method involves sending a gas mixture that includes hydrogen through a membrane comprising the cross-linked polymeric reaction product of the reaction between polybenzimidazole and a crosslinking agent having the formula

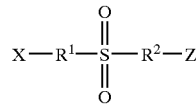

wherein $R^1$ and $R^2$ are independently selected from alkyl having from 1 to 20 carbons, aryl having from 6 to 18 carbons, substituted aryl; wherein $R^1$ and $R^2$ are connected to form a ring structure having from 2 to 5 carbons; and wherein X and Z are independently selected from chloride, bromide, and iodide.

BRIEF DESCRIPTION OF THE DRAWINGS

The accompanying drawings, which are incorporated in and form a part of the specification, illustrate the embodiment(s) of the present invention and, together with the description, serve to explain the principles of the invention. In the drawings.

DETAILED DESCRIPTION OF THE INVENTION

Figure 1:
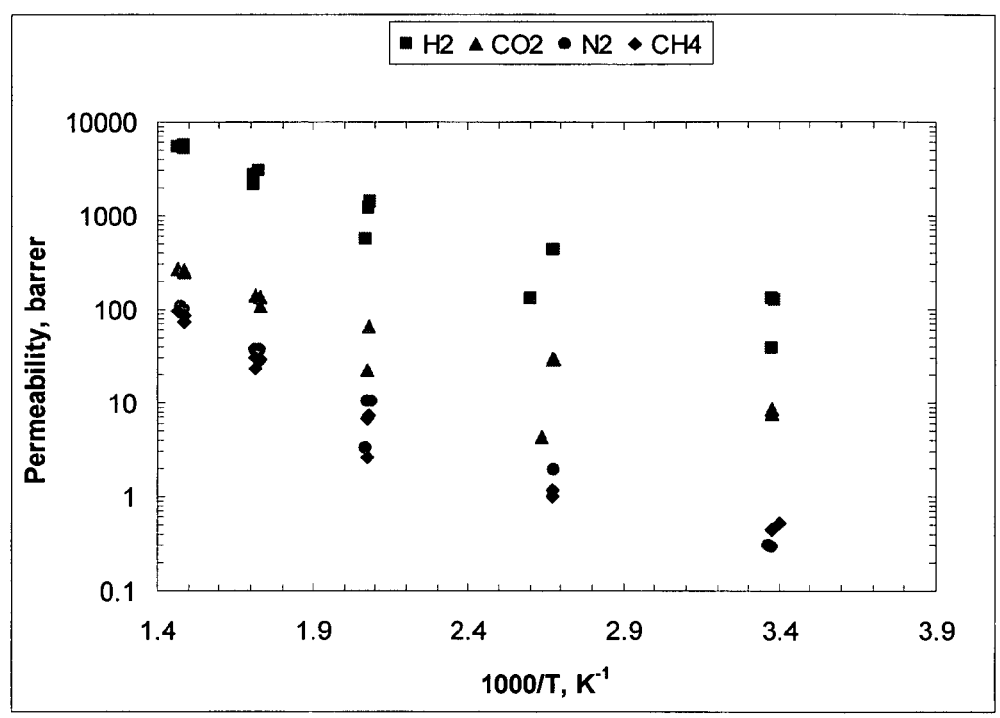
FIG. 1 provides a graph comparing the gas permeabilities of $H_2$, $N_2$, $CO_2$, and $CH_4$ as a function of temperature through the cross-linked reaction product of linear poly-2,2'-(m-phenylene)-5,5'bibenzimidazole membrane with 3,4-dichloro-tetrahydro-thiophene-1,1-dioxide.

Briefly, the present invention relates to a supported, cross-linked polybenzimidazole membrane, a method for preparing the membrane, and a method of using the membrane for gas separation.

One aspect of the invention relates to membranes prepared using the polymeric reaction product of a polybenzimidazole and a crosslinking agent having the formula

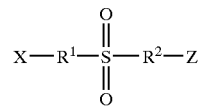

wherein $R^1$ and $R^2$ are independently selected from alkyl having from 1 to 20 carbons, aryl having from 6 to 18 carbons, substituted aryl; wherein $R^1$ and $R^2$ are connected to form a ring structure having from 2 to 5 carbons; and wherein X and Z are independently selected from chloride, bromide, and iodide. Another aspect of the invention relates to a gas separation method that employs the membrane.

An embodiment membrane of the invention was prepared by reacting a linear polybenzimidazole with 3,4-dichloro-tetrahydro-thiophene-1,1-dioxide crosslinking agent. These types of crosslinking agents are commonly referred to in the art as sulfolanes; they have a ring structure with a sulfone group incorporated into the ring structure. For this particular embodiment membrane, a solution of 2,2'-(m-phenylene)-5,5'-bibenzimidazole and 3,4-dichloro-tetrahydro-thiophene-1,1-dioxide was cast onto a porous metal support. Removal of solvent by evaporation resulted in a supported film of the invention that was found to be especially useful for gas separation.

Linear polybenzimidazoles that contain reactive hydrogen atoms on the imidazole rings may be used to prepare a membrane of the invention. These reactive hydrogen atoms combine with atoms of the cross-linking agent to form molecules that are subsequently released during evaporation of the solvent and/or during heat cycling. Examples of linear polybenzimidazoles that contain reactive hydrogens on the imidazole rings include the following:

poly-2,2'-(m-phenylene)-5,5'-bibenzimidazole;
poly-2,2'-(pyridylene-3", 5")-5,5'-bibenzimidazole;
poly-2,2'-(furylene-2",5")-5,5'-bibenzimidazole;
poly-2,2-(naphthalene-1",6")-5,5'-bibenzimidazole;
poly-2,2'-(biphenylene-4",4")-5,5'-bibenzimidazole;
poly-2,2'-amylene-5,5'-bibenzimidazole;
poly-2,2'-octamethylene-5,5'-bibenzimidazole;
poly-2,6-(m-phenylene)-diimidazobenzene;
poly-2,2'-cyclohexenyl-5,5'-bibenzimidazole;
poly-2,2'-(m-phenylene)-5,5'di(benzimidazole)ether;
poly-2,2'-(m-phenylene)-5,5'-di(benzimidazole)sulfide;
poly-2,2'-(m-phenylene)-5,5'-di(benzimidazole)sulfone;
poly-2,2'-(m-phenylene)-5,5'-di(benzimidazole)methane;
poly-2'-2"-(m-phenylene)-5',5"-(di(benzimidazole)propane-2,2;
and poly-2',2"-(m-phenylene)-5',5"-di(benzimidazole)ethylene-1,2 where the double bonds of the ethylene are intact in the final polymer.

Polybenzimidazoles useful with this invention include one or more imidazoles per repeat unit. An example of polybenzimidazole with one imidazole per repeat unit shown below left, and an example of polybenzimidazole with two imidazoles per repeat unit is shown below right.

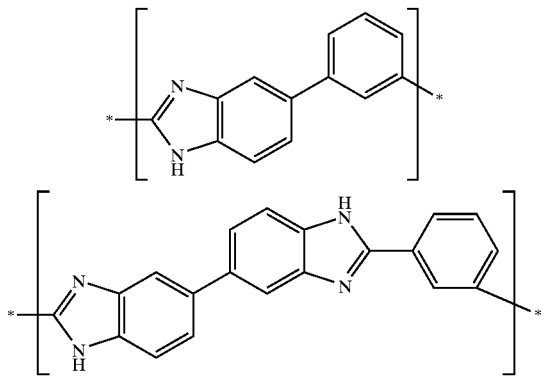

Each repeat unit would react with up to one equivalent of crosslinking agent per imidazole.

Without intending to be bound by any particular explanation, it is believed that the first half equivalent would likely react with the protonated imidazole nitrogen, resulting in a neutral polymeric product. This reaction using a preferred polybenzimidazole, 2,2'-(m-phenylene)-5,5'-bibenzimidazole, is shown in the equation below.

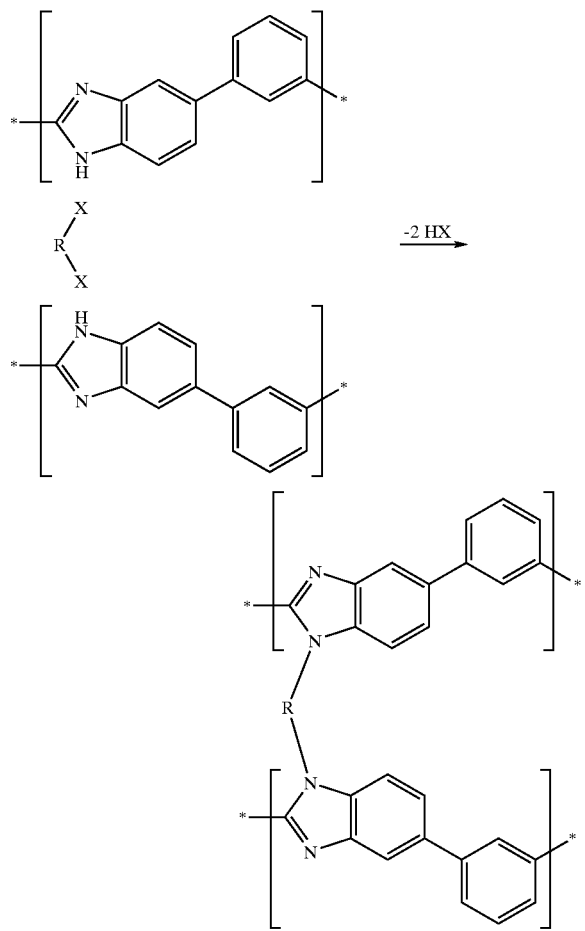

The polymer may be cast onto any surface, preferably the surface of a porous substrate. Porous substrates useful for preparing supported membranes of the invention include porous metal substrates and porous ceramic substrates. An example of a suitable substrate is a commercially available ceramic substrate made from silicon carbide. A preferred substrate can be formed from a porous metal medium such as sintered porous stainless steel. Such a porous metal medium is available from PALL CORPORATION of East Hills, N.Y. under the trade names PSS (a sintered stainless steel powder metal medium), PMM (a porous sintered metal membrane including metal particles sintered to a foraminate support), PMF (a porous sintered fiber mesh medium), Rigimesh (a sintered woven wire mesh medium), Supramesh (stainless steel powder sintered to a Rigimesh support), PMF II (a porous sintered fiber metal medium), and combinations of more than one of these materials. A sintered metal medium for use in the present invention may be formed from any of a variety of metal materials including alloys of various metals such as chromium, copper, molybdenum, tungsten, zinc, tin, gold, silver, platinum, aluminum, cobalt, iron, and magnesium, as well as combinations of metals and alloys, including boron-containing alloys. Brass, bronze, and nickel/chromium alloys, such as stainless steels, the Hastelloys, the Monels and the Inconels, as well as a 50-weight percent chromium alloy, may also be used. Substrates may include nickel and alloys of nickel, although it is believed that nickel may react with and degrade the supported polymer, which would affect the longevity of the invention membrane. Examples of other suitable high temperature substrates include those formed of glass fibers.

A working embodiment of the present invention was prepared by casting a solution containing poly-2,2'-(m-phenylene)-5,5'bibenzimidazole (CELANESE CORPORATION, $\overline{M}_n=20\times10^3$) and 3,4-dichloro-tetrahydro-thiophene-1,1-dioxide in dimethylacetamide onto a porous stainless steel substrate. The solution is typically prepared at elevated temperature and contains about 10 to 15 weight percent polybenzimidazole in dimethylacetamide and an amount of the 3,4-dichloro-tetrahydro-thiophene-1,1-dioxide to give the crosslinking density of interest. The following EXAMPLE provides a procedure for preparing an invention membrane.

EXAMPLE

Ten grams of a membrane casting solution containing 20 weight percent (wt 15%) of a cross-linking agent was prepared by dissolving 0.8 gram of poly-2,2'-(m-phenylene)-5,5'bibenzimidazole (CELANESE CORPORATION, $\overline{M}_n=20\times10^3$, 0.78 $\mu$m-diameter polymer particles) and 0.2 gram of 3,4-dichloro-tetrahydro-thiophene-1,1-dioxide in 9 grams of N,N-dimethylacetamide. For this EXAMPLE, assuming complete reaction, the composition containing 20 weight percent of the cross-linking agent and 80 percent of the polymer would produce a 40 percent crosslinked neutral polymer product (slightly less than one equivalent of cross-linking agent per two imidazoles). The reaction between the polymer and crosslinking agent is shown below.

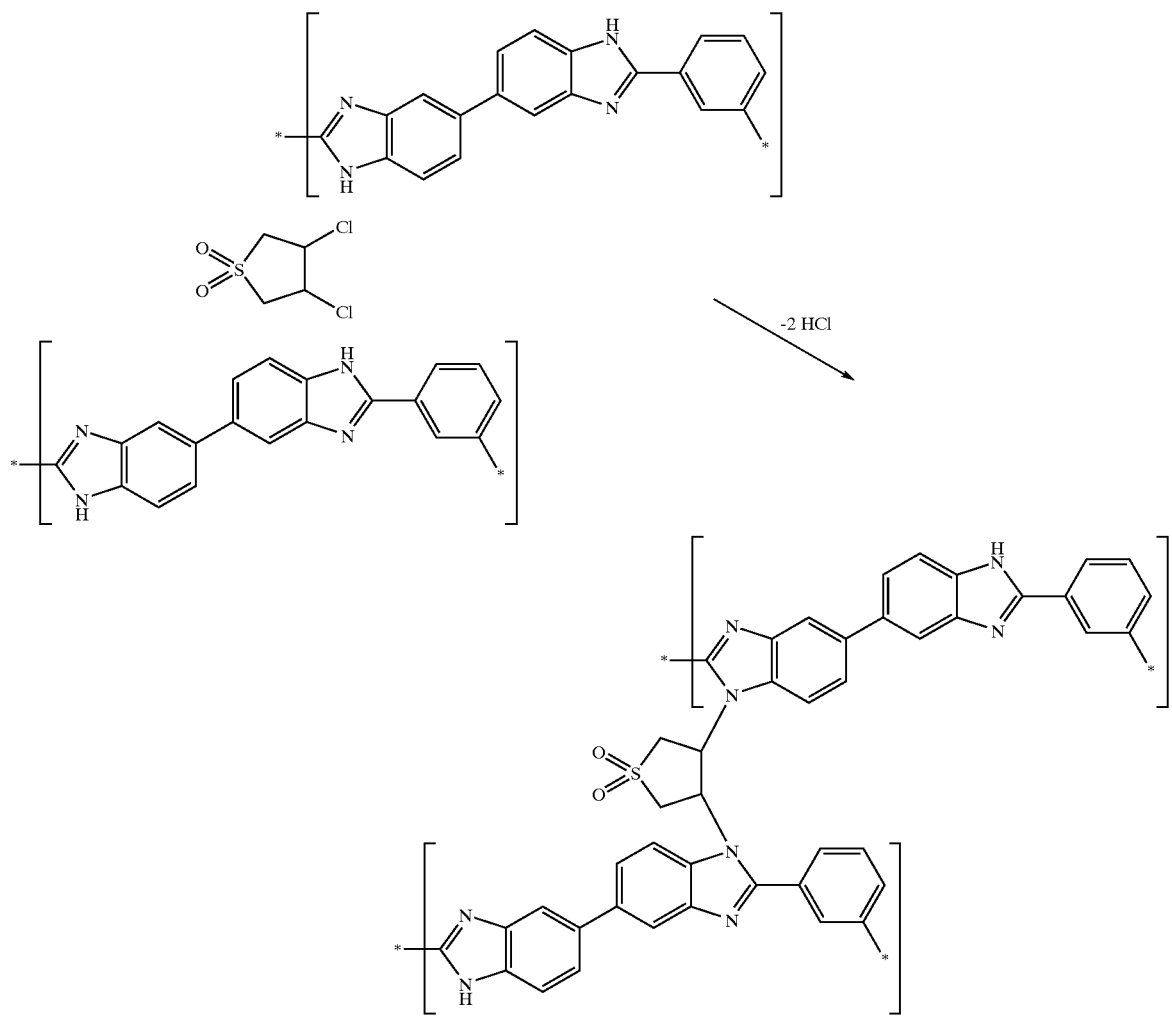

A 40 microliter (μl) aliquot of the solution was evenly spread on a stainless steel substrate (PALL CORPORATION). After drying at room temperature for 15 min, the resulting supported polymer film was heated to a temperature of 50 degrees Celsius for 60 minutes to allow more complete solvent evaporation. The membrane was heat-cycled between 50 degrees Celsius and 300 degrees Celsius (90-min cycle time) a total of five times to enhance stability, resulting in a fully dense supported cross-linked polybenzimidazole membrane.

It should be understood that the polymer membranes prepared from solutions that contain other solvents, and greater and lesser amounts of the crosslinking agent also fall within the scope of the invention. Any solvent capable of dissolving polybenzimidazole, such as N,N-dimethylacetamide, N,N-dimethylformamide or N-vinylpyrrolidone, can be used with the invention. Membranes of neutral polymers can be obtained using from about slightly greater than zero equivalents to about one-half equivalent of crosslinking agent per imidazole in the starting polymer. Using slightly greater than about zero equivalents would yield a lightly crosslinked polymer, while about one half of an equivalent would yield a neutral crosslinked polymer where all (or most) of the protonated imidazole nitrogen atoms of the starting polymer have reacted.

It should be understood that this invention not only includes neutral cross linked polybenzimidazole as described above, but also ionic polymers that likely result from reaction of the crosslinking agent with unprotonated nitrogen atoms of the imidazole ring, as illustrated in the equation below.

-continued

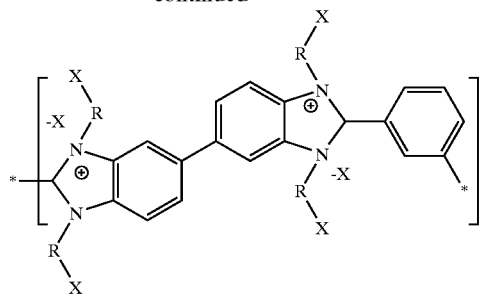

A fully crosslinked ionic polybenzimidazole membrane of the type shown in the above equation would be obtained by reacting about one equivalent of crosslinking agent X—R—X per imidazole of the starting polymer. This reaction stoichiometry would result in complete reaction of all the imidazole nitrogen atoms with the crosslinking agent X—R—X.

In order to demonstrate advantages of the cross-linked polymer membrane for gas separation, polymer membranes of unmodified linear poly-2,2'-(m-phenylene)-5,5'bibenzimidazole were also prepared: The procedure used for preparing unmodified polybenzimidazole membranes followed that as described for the cross-linked membrane with the exception that the cross-linking agent was omitted. Two specific comparison membranes were prepared from a solution of 10 weight percent poly-2,2'-(m-phenylene)-5, 5'bibenzimidazole in dimethylacetamide. A 40-$\mu$L aliquot of the solution was evenly spread on one substrate and spin coated on another, the substrates used being of the same type of stainless steel substrate as was used to prepare the supported cross-linked polymer membrane of the invention described previously. Each was dried at room temperature for 15 min, and the resulting supported polymer films were heated to about 50 degrees Celsius for about 60 minutes to allow more complete solvent evaporation. Each was heat cycled between 50 degrees Celsius and 300 degrees Celsius (90-min cycle time) a total of five times to enhance stability, as described for the crosslinked membrane, which resulted in fully dense supported polybenzimidazole membranes.

The gas permeability and gas selectivity of the supported cross-linked polybenzimidazole membrane was determined and compared to that for the analogous, unmodified, linear polybenzimidazole membrane using permeate pressure-rise measurements over a wide temperature range. Gas permeability is defined herein according to equation 1 below:

$$P = \frac{(10^{10})(v)(L)}{(A)(\Delta p)} \quad (1)$$

where v is the gas flux in cubic centimeters per second (cm³/s), L is the membrane thickness in cm, A is the membrane area in cm², and $\Delta p$ is the pressure difference across the membrane in cm Hg.

Gas selectivity, $\alpha_{A/B}$, is defined herein as the ratio of the permeability of gas A divided by the permeability of gas B.

The practice of the invention can be further understood with the accompanying FIGURES. FIG. 1 provides a graph comparing the gas permeabilities of $H_2$, $N_2$, $CO_2$, and $CH_4$ as a function of temperature through the cross-linked reaction product of linear poly-2,2'-(m-phenylene)-5,5'bibenzimidazole membrane with 3,4-dichloro-tetrahydrothiophene-1,1-dioxide. TABLE 1 below summarizes the data used in FIG. 1.

TABLE 1

| | | Cross-linked PBI | | Unmodified, linear PBI | |
|---|---|---|---|---|---|
| | | Temperature, °C. | Permeability, barrer | Temperature, °C. | Permeability, barrer |
| $H_2$ | | 23 | 38.43168 | 17 | 5.117 |
| | | 111 | 131.071 | 95 | 19.221 |
| | | 211 | 564.5009 | 160 | 33.845 |
| | | 311 | 2193.375 | 223 | 73.057 |
| | | 409 | 5316.602 | 313 | 165.76299 |
| | | 312 | 2747.458 | 315 | 171.1804 |
| | | 208 | 1216.592 | 279 | 125.53064 |
| | | 101 | 427.6633 | 181 | 50.376722 |
| | | 23 | 132.8588 | 121 | 23.689705 |
| | | 22 | 128.0179 | 24 | 4.7438374 |
| | | 100 | 435.1346 | 373 | 263.25309 |
| | | 207 | 1411.278 | | |
| | | 306 | 3020.782 | | |
| | | 400 | 5186.646 | | |
| | | 400 | 5720.059 | | |
| $N_2$ | | 211 | 3.313368 | 21 | 0.0258826 |
| | | 305 | 28.21815 | 95 | 0.077025 |
| | | 304 | 36.41971 | 156 | 0.2030286 |
| | | 404 | 107.1163 | 216 | 0.7087747 |
| | | 304 | 36.41971 | 313 | 2.2544598 |
| | | 206 | 10.442 | 313 | 2.1886325 |
| | | 100 | 1.943046 | 279 | 1.2166992 |
| | | 23 | 0.291257 | 181 | 0.2586471 |
| | | 24 | 0.300519 | 121 | 0.0670755 |
| | | 100 | 1.895188 | 23 | 0.0169855 |
| | | 210 | 10.36877 | 369 | 4.0848769 |
| | | 310 | 36.8027 | | |
| | | 400 | 101.1812 | | |
| | | 400 | 98.61064 | | |
| $CO_2$ | | 106 | 4.303982 | 313 | 7.6339218 |
| | | 210 | 22.37276 | 313 | 7.5653723 |
| | | 305 | 107.7932 | 279 | 5.3973399 |
| | | 409 | 270.7548 | 181 | 2.1226676 |
| | | 304 | 133.9686 | 121 | 1.1005387 |
| | | 208 | 65.99256 | 23 | 0.3071448 |
| | | 100 | 29.41249 | 369 | 11.299329 |
| | | 23 | 8.443571 | | |
| | | 23 | 7.553125 | | |
| | | 101 | 28.78142 | | |
| | | 208 | 65.94301 | | |
| | | 310 | 139.1192 | | |
| | | 400 | 254.186 | | |
| | | 400 | 256.5045 | | |
| $CH_4$ | | 210 | 2.593238 | 315 | 1.68119 |
| | | 309 | 22.88694 | 313 | 1.6964713 |
| | | 409 | 94.65714 | 279 | 0.9569662 |
| | | 304 | 29.50894 | 181 | 0.1534 |
| | | 208 | 7.462297 | 121 | 0.0093627 |
| | | 101 | 1.174854 | 370 | 4.5872553 |
| | | 21 | 0.529546 | | |
| | | 23 | 0.438549 | | |
| | | 101 | 1.001837 | | |
| | | 210 | 6.869058 | | |
| | | 310 | 30.40814 | | |
| | | 400 | 85.98601 | | |
| | | 400 | 74.9465 | | |

The gas permeability data were collected over a wide temperature range of from about 20 degrees Celsius to about 400 degrees Celsius. Filled square symbols shown in FIG. 1 relate to permeability data plotted for hydrogen; filled triangles relate to data plotted for carbon dioxide; filled circles relate to data plotted for nitrogen; and filled diamond shaped symbols relate to data plotted for methane. FIG. 1 shows that the order of gas permeability for this membrane is $H_2 > CO_2 > N_2 > CH_4$. This is the order generally observed for other gas-permeable glassy membranes. This response of the membrane permeability with increasing temperature is typical of polymer membranes due to the increased motion of the polymer chains.

Figure 2:
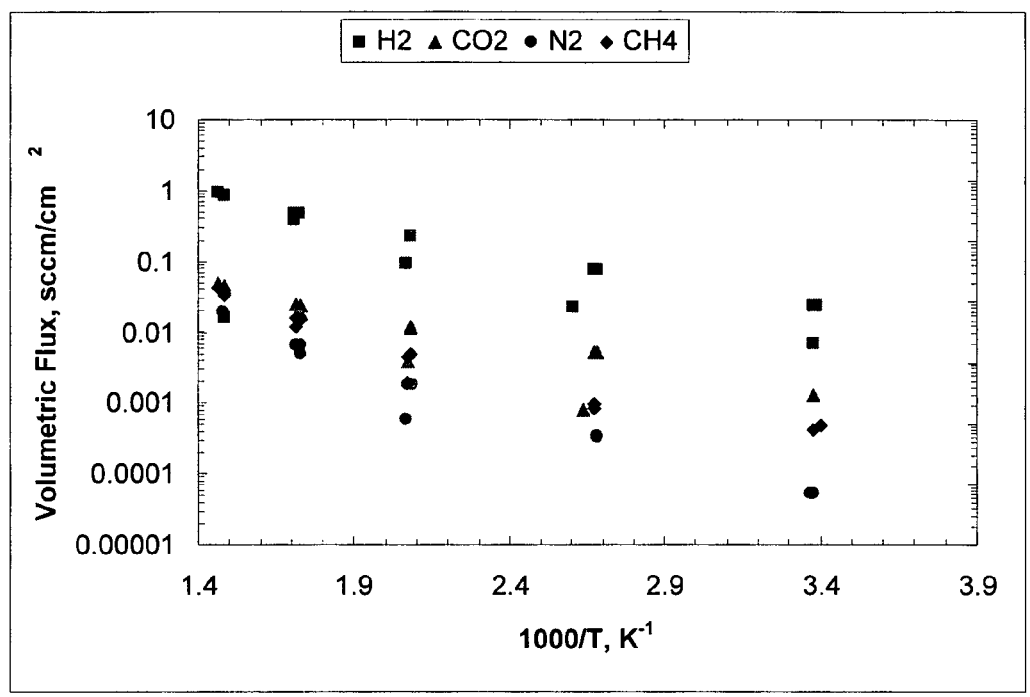
FIG. 2 provides a graph comparing the volumetric fluxes of $H_2$, $N_2$, $CO_2$, and $CH_4$ as a function of temperature through the cross-linked reaction product of linear poly-2,2'-(m-phenylene)-5,5'bibenzimidazole membrane with 3,4-dichloro-tetrahydro-thiophene-1,1-dioxide.

FIG. 2 provides a graph comparing the volumetric fluxes of $H_2$, $N_2$, $CO_2$, and $CH_4$ as a function of temperature through the cross-linked reaction product of linear poly-2,2'-(m-phenylene)-5,5'bibenzimidazole membrane with 3,4-dichloro-tetrahydro-thiophene-1,1-dioxide. The symbols used for FIG. 2 are the same as those for FIG. 1: filled square symbols shown in FIG. 1 relate to permeability data plotted for hydrogen; filled triangles relate to data plotted for carbon dioxide; filled circles relate to data plotted for nitrogen; and filled diamond shaped symbols relate to data plotted for methane. Ultimately, volumetric flux controls the economics of the application. The controlling membrane thickness of these composite membranes is not easily determined but is estimated at approximately 20 $\mu$m.

Figure 3:
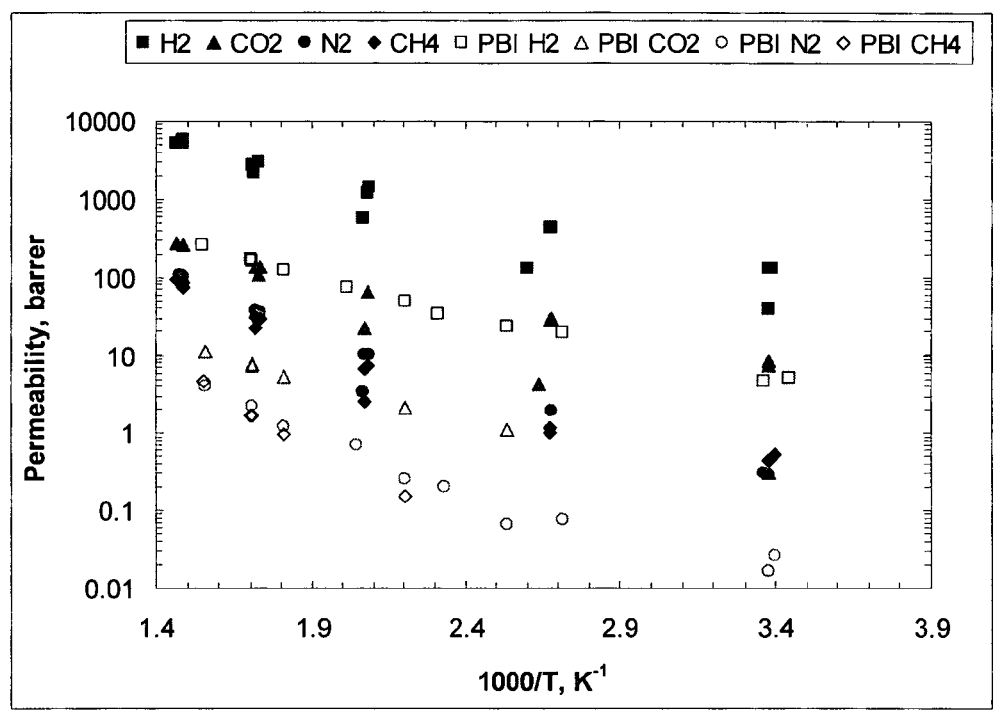
FIG. 3 provides a graph comparing the gas permeabilities of $H_2$, $N_2$, $CO_2$, and $CH_4$ as a function of temperature through unmodified linear poly-2,2'-(m-phenylene)-5,5'bibenzimidazole membrane with those for the cross-linked reaction product of linear poly-2,2'-(m-phenylene)-5,5'bibenzimidazole membrane with 3,4-dichloro-tetrahydro-thiophene-1,1-dioxide.

FIG. 3 provides a graph comparing the gas permeabilities of $H_2$, $N_2$, $CO_2$, and $CH_4$ as a function of temperature through unmodified linear poly-2,2'-(m-phenylene)-5,5'bibenzimidazole membrane with those for the cross-linked reaction product of linear poly-2,2'-(m-phenylene)-5,5'bibenzimidazole membrane with 3,4-dichloro-tetrahydro-thiophene-1,1-dioxide. The filled symbols used for FIG. 3 have the same meaning as they do for FIG. 1 and FIG. 2: filled square symbols shown in FIG. 1 relate to permeability data plotted for hydrogen; filled triangles relate to data plotted for carbon dioxide; filled circles relate to data plotted for nitrogen; and filled diamond shaped symbols relate to data plotted for methane. The analogous unfilled symbols relate to the permeability data for these gases for the unmodified polymer. As FIG. 3 indicates, the permeability of the cross-linked polybenzimidazole membrane to each gas is significantly higher than for unmodified PBI. Typically, with increased permeability, selectivity is adversely affected. However, for this material, the selectively between $H_2$ and $CO_2$ does not appear to be significantly affected, resulting in an improved combination of permeability and selectivity that will be more economical in its application.

Cross-linking a membrane generally tends to improve selectivity but decrease permeability. For the membrane of the invention, neither selectivity nor permeability appears to be adversely affected by the cross-linking; in fact, permeability, unexpectedly, has increased upon cross-linking.

Gas mixtures that include gases such as hydrogen sulfide, sulfur dioxide ($SO_2$), carbonyl sulfide (COS), carbon monoxide, carbon dioxide, nitrogen, hydrogen, chlorine, ammonia, and methane can be separated using the invention membrane.

In summary, the cross-linked reaction product of a polybenzimidazole and a sulfolane displays similar gas selectivity as the unmodified analog, but is more permeable over a wide temperature range (measured up to about 400 degrees Celsius). Gas permeability and selectivity results indicate that the cross-linked membrane of the invention is useful for separating hydrogen and carbon dioxide from mixed gas streams, preferably at elevated temperatures.

The foregoing description of the invention has been presented for purposes of illustration and description and is not intended to be exhaustive or to limit the invention to the precise form disclosed, and obviously many modifications and variations are possible in light of the above teaching. For example, while poly-2,2'-(m-phenylene)-5,5'-bibenzimidazole was used with a dichlorosulfolane crosslinking agent to demonstrate this invention, it should be understood that other linear polybenzimidazoles that contain reactive hydrogen atoms can be used, as well as cross-linking agents that contain bromine and/or iodine reactive leaving groups.

The embodiment(s) were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for gas separation, comprising sending a gas mixture through a membrane comprising the cross-linked polymeric reaction product of the reaction between polybenzimidazole and a crosslinking agent having the formula

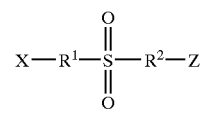

wherein $R^1$ and $R^2$ are independently selected from alkyl having from 1 to 20 carbons, aryl having from 6 to 18 carbons, substituted aryl;
wherein $R^1$ and $R^2$ are connected to form a ring structure having from 2 to 5 carbons; and
wherein X and Z are independently selected from chloride, bromide, and iodide.

2. The method of claim 1, wherein the crosslinking agent comprises 3,4-dichloro-tetrahydro-thiophene-1,1-dioxide.

3. The method of claim 1, wherein the polybenzimidazole comprises poly-2,2'-(m-phenylene)-5,5'-bibenzimidazole.

4. The method of claim 1, wherein the membrane further comprises a porous support comprising metal, metal alloys, ceramic, or combinations thereof.

5. The method of claim 1, wherein the gas mixture comprises at least one gas selected from the group consisting of hydrogen sulfide, sulfur dioxide, carbonyl sulfide, carbon monoxide, carbon dioxide, nitrogen, hydrogen, and methane.

6. The method of claim 1, wherein the membrane is heated to a temperature from about 25 degrees Celsius to about 400 degrees Celsius.

7. A method for separating carbon dioxide from a gas mixture, comprising sending a gas mixture that includes carbon dioxide through a membrane comprising the cross-linked polymeric reaction product of the reaction between polybenzimidazole and a crosslinking agent having the formula

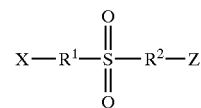

wherein $R^1$ and $R^2$ are independently selected from alkyl having from 1 to 20 carbons, aryl having from 6 to 18 carbons, substituted aryl;
wherein $R^1$ and $R^2$ are connected to form a ring structure having from 2 to 5 carbons; and
wherein X and Z are independently selected from chloride, bromide, and iodide.

8. The method of claim 7, wherein the crosslinking agent comprises 3,4-dihalo-tetrahydro-thiophene-1,1-dioxide where halo is selected from the group consisting of chloro, bromo, and iodo.

9. The method of claim 7, wherein the membrane further comprises a porous support comprising a material selected from the group consisting of metals, metal alloys, ceramic materials, and combinations thereof.

10. The method of claim 7, wherein the gas mixture comprises at least one hydrocarbon.

11. The method of claim 7, wherein the gas mixture comprises methane.

12. The method of claim 7, further comprising heating the membrane to a temperature from about 25 degrees Celsius to about 400 degrees Celsius.

13. The method of claim 7, wherein the cross-linked polybenzimidazole comprises the reaction product of poly-2,2'-(m-phenylene)-5,5'-bibenzimidazole and 3,4-chloro-tetrahydro-thiophene-1,1-dioxide.

14. A method for separating hydrogen from a gas mixture, comprising sending a gas mixture that includes hydrogen through a membrane comprising the cross-linked polymeric reaction product of the reaction between polybenzimidazole and a crosslinking agent having the formula

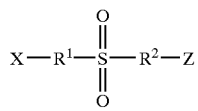

wherein $R^1$ and $R^2$ are independently selected from alkyl having from 1 to 20 carbons, aryl having from 6 to 18 carbons, substituted aryl;
wherein $R^1$ and $R^2$ are connected to form a ring structure having from 2 to 5 carbons; and
wherein X and Z are independently selected from chloride, bromide, and iodide.

15. The method of claim 14, wherein the crosslinking agent comprises 3,4-dihalo-tetrahydro-thiophene-1,1-dioxide where halo is selected from the group consisting of chloro, bromo, and iodo.

16. The method of claim 14, wherein the membrane further comprises a porous support comprising a material selected from the group consisting of metals, metal alloys, ceramic materials, and combinations thereof.

17. The method of claim 14, wherein the gas mixture comprises at least one hydrocarbon.

18. The method of claim 14, wherein the gas mixture comprises methane.

19. The method of claim 14, further comprising heating the membrane to a temperature from about 25 degrees Celsius to about 400 degrees Celsius.

20. The method of claim 14, wherein the cross-linked reaction product comprises the reaction product of poly-2,2'-(m-phenylene)-5,5'-bibenzimidazole and 3,4-chloro-tetrahydro-thiophene-1,1-dioxide.

21. A cross-linked membrane prepared by placing a solution of polybenzimidazole and a crosslinking agent on a porous support and removing solvent from the solution, the crosslinking agent having the formula

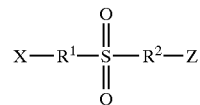

wherein $R^1$ and $R^2$ are independently selected from alkyl having from 1 to 20 carbons, aryl having from 6 to 18 carbons, substituted aryl;
wherein $R^1$ and $R^2$ are connected to form a ring structure having from 2 to 5 carbons; and
wherein X and Z are independently selected from chloride, bromide, and iodide.

22. The cross-linked membrane of claim 21, wherein the crosslinking agent comprises 3,4-dihalo-tetrahydro-thiophene-1,1-dioxide where halo is selected from the group consisting of chloro, bromo, and iodo.

23. The membrane of claim 21, wherein the solution comprises from greater than zero equivalents to about one equivalent of crosslinking agent, said cross-linking agent comprising 3,4-dichloro-tetrahydro-thiophene-1,1-dioxide.

24. A polymeric reaction product of a polybenzimidazole and a crosslinking agent having the formula

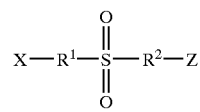

wherein $R^1$ and $R^2$ are independently selected from alkyl having from 1 to 20 carbons, aryl having from 6 to 18 carbons, substituted aryl;
wherein $R^1$ and $R^2$ are connected to form a ring structure having from 2 to 5 carbons; and
wherein X and Z are independently selected from chloride, bromide, and iodide.

25. The polymeric reaction product of claim 24, wherein the crosslinking agent comprises 3,4-dihalo-tetrahydro-thiophene-1,1-dioxide, wherein halo is selected from the group consisting of chloro, bromo, and iodo.

26. The polymeric reaction product of claim 24, further comprising a porous support for supporting said polymeric reaction product.

27. The polymeric reaction product of claim 26, wherein said porous support comprises metal, metal alloy, ceramic, or combinations thereof.

28. The polymeric reaction product of claim 24, wherein said polybenzimidazole comprises poly-2,2'-(m-phenylene-5,5'bibenzimidazole).

* * * * *